United States Patent [19]

Ben-Porat

[11] 4,397,431
[45] Aug. 9, 1983

[54] FAIL-SAFE, ANTI-ICING SYSTEM FOR AIRCRAFT ENGINES

[75] Inventor: Avi Ben-Porat, Norwalk, Conn.

[73] Assignee: Avco Corporation, Stratford, Conn.

[21] Appl. No.: 317,443

[22] Filed: Nov. 2, 1981

[51] Int. Cl.³ .................. B64D 33/02; F02G 3/00
[52] U.S. Cl. ........................... 244/53 B; 55/306; 60/39.092; 60/39.093
[58] Field of Search ............. 244/53 R, 53 B, 134 R; 60/39.09 D, 39.09 P; 55/306; 98/1.5; 137/15.1, 15.2, 448.2, 448.4

[56] References Cited

U.S. PATENT DOCUMENTS

| | | | |
|---|---|---|---|
| 2,381,705 | 8/1945 | Vokes | 55/306 |
| 3,329,377 | 7/1967 | Peterson et al. | 244/53 B |
| 3,544,045 | 12/1970 | Butscher | 98/1.5 |
| 3,952,972 | 4/1976 | Tedston et al. | 244/53 B |
| 3,991,782 | 11/1976 | Schwarzler | 244/53 B |
| 4,250,703 | 2/1981 | Norris et al. | 244/53 B |
| 4,346,860 | 8/1982 | Tedstone | 244/53 B |

FOREIGN PATENT DOCUMENTS 124101 4/1947 Australia .................. 55/306

Primary Examiner—Galen L. Barefoot
Attorney, Agent, or Firm—Ralph D. Gelling

[57] ABSTRACT

An actuating linkage is provided for use in an aircraft engine having a double door-type particle separator, anti-icing system installed within its air intake ducts. The actuating linkage interconnects the deflecting vane and the bypass door through a coupler link. The deflecting vane is pivotally connected to a linear link which is connected to an actuator link about a pivot point. Movement of the actuator link varies the relative positions of the deflecting vane and the bypass door between ram mode and anti-icing mode positions. The actuating linkage partially balances the aerodynamic forces on the deflecting vane and bypass door so that the input required to operate the anti-icing system may be manually applied by the pilot. The actuating linkage is fail-safe, in that the linkage is operative such that should the actuator link extending to the pilot station fail, the aerodynamic forces on the bypass door cause the deflecting vane and bypass door to be actuated to the anti-icing mode position.

7 Claims, 6 Drawing Figures

FAIL-SAFE, ANTI-ICING SYSTEM FOR AIRCRAFT ENGINES

BACKGROUND OF THE INVENTION

The present invention relates to a system for separating and removing foreign particles from an airstream supplied to the intake passage of an aircraft engine. More particularly, it relates to an actuating linkage system for use with an engine provided with an air intake duct having a double door type of particle separator, anti-icing system installed therein.

Aircraft engines require a flow of atmospheric air for their operation. The engine inlet and air intake ducting direct the required flow of air to the engine air intake provided at the entrance face of the compressor. Variations in the pressure of this incoming flow of air generally decrease the efficiency of the engine. More particularly, decreases in the pressure of the airflow reaching the engine air intake result in successively magnified power losses through the other engine components. Such decreases in the pressure generally arise because aircraft engines are required to operate in a variety of weather conditions and from variously prepared landing sites. Debris in the atmosphere as, for example, sand, stones, birds and the like, may pose a serious hazard if ingested by the engine, because they tend to block the air intake or may cause extensive damage to or erosion of the compressor blades. Operation of the aircraft in snow, hale, mixed icing, and other weather conditions commonly results in the accumulation of ice or slush on the air intake of the engine which decreases the incoming airflow to the compressor. The latter may lead to serious losses of power and may in the extreme case lead to engine burnout.

Various protective devices and methods have been employed to remove the aforementioned foreign particles from the incoming airstream of aircraft engines. One method particularly applicable to engines having centrally located air intakes, for example, a gas turbine propeller aircraft engine, is to provide an air intake duct which is arranged to extend parallel to the engine and has an inertial particle separator installed therein, as is described in U.S. Pat. No. 3,329,377. Generally, an air intake duct is elongated and has a forward facing open inlet at one end, a discharge outlet at the other end, and an intermediate side opening disposed in the side wall of the engine. The inertial particle separator is provided in the form of a fixed deflecting vane which is placed within the duct between the forward facing inlet and the side opening in the engine side wall. The deflecting vane is installed at a fixed angle within the interior of the air intake duct such that the internal cross-section of the duct is gradually reduced. Incoming air is deflected through a substantial angle around the trailing edge of the deflecting vane and up into the side opening leading to the engine, while ice and other particles having greater inertia pass in a substantially unimpeded path through the duct and thence out the discharge outlet to the atmosphere. The inertial particle separator thus divides the incoming air flow into two parts, with one stream of clean air being directed towards the engine air intake and the other stream carrying ice and other debris being ducted overboard. The inertial particle separator is an effective means of preventing foreign particles from entering the engine air intake. At the same time, however, it does decrease the pressure of the incoming airflow reaching the engine air intake by dividing the incoming airflow. There are certain flight modes of operation when the full power provided by full ram effect of the incoming airflow is necessary, as for example, during rapid ascent, take-offs and high speed maneuvering of the craft. The above mentioned prior art system does not have the capability of providing such full ram effect of the incoming air and hence is limited for use with certain aircraft.

In another prior art inertial particle separator anti-icing system the air intake duct is provided with an adjustable deflecting vane and in addition, an adjustable bypass door disposed at the downstream portion of the duct. In this prior art air intake system, the deflecting vane may be raised to a stowed position out of the path of the incoming airflow while the bypass door may be raised to block off the discharge outlet such that all of the incoming airflow is directed through the side opening leading to the engine air intake. The relative positions of the deflecting vane and the bypass door in the latter case correspond to the air intake system in the ram mode position. The latter system may be alternately shifted to an anti-icing mode in which the deflecting vane is lowered into the path of the incoming airflow to act as an inertial particle separator, while the bypass door is lowered to a stowed position so as to open the discharge outlet. At normal air speeds, the incoming airflow exerts relatively large aerodynamic forces on the deflecting vane and the bypass door, so that individual boost actuators are provided to assist in varying the positions of the bypass door and the deflecting vane. The dual door anti-icing system affords an air intake system which may be shifted between a ram mode position and an anti-icing mode position as required for operation of the engine. However, individual actuators for both the deflecting vane and the bypass door generally have a high failure rate. Thus, for example, in the worst case, if the actuator for the bypass door fails while the bypass door is in its stowed position, and the actuator for the deflecting vane fails while the deflecting vane is in its stowed position, incoming air flows through the duct and out of the discharge outlet without being directed to the engine air intake. The latter causes an almost complete loss of power in the engine. Alternatively, the actuator for the bypass door may fail with the bypass door in its stowed position while the actuator for the deflecting vane remains operative so that the aircraft can only be operated at the decreased power provided when the air intake system is in the anti-icing mode. Since the actuators are usually electromechanical, the pilot may not become aware of a system failure until a large decrease in power is felt, and even then, the pilot does not known at first which part of the system has failed and what actions need to be taken. Since the failure rate of actuators is generally high, it has been found that pilots have lost confidence in the prior art anti-icing system whereby pilots operate the aircraft in ram mode only, for fear of not being able to restore the system to ram mode after shifting to anti-icing mode. Of course, in so doing, the pilots are inviting all of the attendant dangers associated with not removing ice and other particles from the incoming airflow to the engine.

Accordingly, in order to overcome the shortcomings of the prior art devices, it is an object of the subject invention to provide an anti-icing system which is effective in preventing the ingress of water, snow, ice and other debris into the air intake of an aircraft engine.

It is another object of the subject invention to provide an anti-icing system which may be shifted alternately between a ram mode position and an anti-icing mode position with reliability.

It is a further object of the subject invention to provide a manually operative anti-icing system which is directly under the pilot's control, so that the pilot is assured at all times that the system is operative.

It is still another object of the subject invention to provide an anti-icing system which is designed to be fail-safe, such that the failure of the system components does not invalidate the system function or the ensuing flight safety of the aircraft.

SUMMARY OF THE INVENTION

The subject invention provides an improved anti-icing system for use with aircraft engines equipped with air intake ducts having a deflecting vane and a bypass door installed therein. More particularly, the subject invention provides an actuating linkage system which is operative to vary the relative positions of the deflecting vane and the bypass door between an anti-icing mode and a ram mode position.

The new and improved actuating linkage system of the subject invention is for aircraft engines having centrally located air intakes which are provided with air intake ducts that extend longitudinally of the engine. Usually the air intake duct is disposed at the underside of the engine, and is formed as an integral part of the engine nacelle. The air intake duct has a forward facing open inlet at one end and a discharge outlet at the other end. A side opening is provided in the top side wall of the duct at a point intermediate its length and is disposed directly below the air intake of the engine. A deflecting vane is rotatably and translatably mounted at one end to the top side wall of the duct in the forward portion of the duct, at a point intermediate the forward facing open inlet and the side opening in the top side wall. In addition, a bypass door is provided which is pivotally connected at the downstream end of the bottom side wall of the duct at a point intermediate the side opening in the top side wall and the discharge outlet. These components form the air intake system of the aircraft engine and may be shifted alternately between a ram mode position and an anti-icing position.

The air intake system in the ram mode position corresponds to that arrangement of component parts in which the deflecting vane is raised to a position so that it lies adjacent and generally parallel to the top side wall of the intake duct, with the bypass door being raised to a position such that it closes off the discharge outlet. In the ram mode position, the incoming flow of air enters the duct through the forward facing inlet and is directed with full force up through the side opening in the top side wall of the duct to the engine air intake.

In the anti-icing mode, the deflecting vane is lowered into the incoming air stream to form approximately a 17° angle with the top side wall, while the rear bypass door is lowered to a stowed position to lie generally parallel and adjacent to the bottom side wall. The deflecting vane in this position decreases the cross-sectional area within the duct. The incoming airstream enters the duct through the forward facing inlet, is deflected through a substantial angle around the deflecting vane, and continues up through the side opening in the top side wall to the engine air intake, whereas, airborne particles having greater inertia pass through the duct without substantial deflection and are exhausted through the discharge outlet of the duct.

The new and improved linkage system of the subject invention includes a connector link which joins the deflecting vane and the bypass door in such manner that the connector link is pivotally connected to the free end of the deflecting vane at one end, and at its other end is pivotally connected to the bypass door at a point intermediate the length of the bypass door. A second link extends from and is pivotally connected to the free end of the deflecting vane at one end and at its other end is connected to a support sleeve which is rotatably mounted on a journal bearing fixedly extending from a side wall of the duct adjacent to the top side wall. An actuator link is connected to the rotatable support sleeve at one end and is connected at its opposite end to a mechanical actuation system extending to the pilot station.

Large aerodynamic forces are exerted on the deflecting vane and the bypass door by the incoming airflow. The aerodynamic force on the deflecting vane tends to push the deflecting vane out of the incoming airflow and up into its stowed position. The aerodynamic forces on the bypass door act to push against the bypass door so that it will move out of the airflow down into its stowed position. The new and improved linkage system of the subject invention balances the opposed aerodynamic forces in such a manner that in shifting the system from ram mode to anti-icing mode, the aerodynamic forces pushing on the bypass door are utilized to overcome the forces pushing on the deflecting vane which resist the lowering of the deflecting vane to its anti-icing position. Conversely, in shifting the system from anti-icing mode back to ram mode, the aerodynamic forces pushing upward on the deflecting vane are utilized in conjunction with the pilot input force on the actuating link to restore the bypass door to a ram mode position. By varying the length of the actuating link, the mechanical advantage of the subject system may be adjusted such that the amount of input which must be applied by the pilot is small thereby enabling the subject system to be manually operated by the pilot.

Another feature of the new and improved linkage system of the subject invention is that it is a fail-safe system. The rear bypass door and the deflecting vane are connected so that in the event the actuator should fail, the aerodynamic forces on the bypass door will automatically deploy the components of the system into the anti-icing mode. The subject system is designed so that it will not fail in such a manner that the deflecting vane is stowed and the bypass door is open so as to permit air to flow in through the forward facing inlet and out the discharge outlet without being directed through the side opening to the engine intake.

Further objects and advantages of the subject invention will become apparent from the following detailed description taken in conjunction with the accompanying drawings in which:

DESCRIPTION OF THE PREFERRED EMBODIMENT

Figure 1:
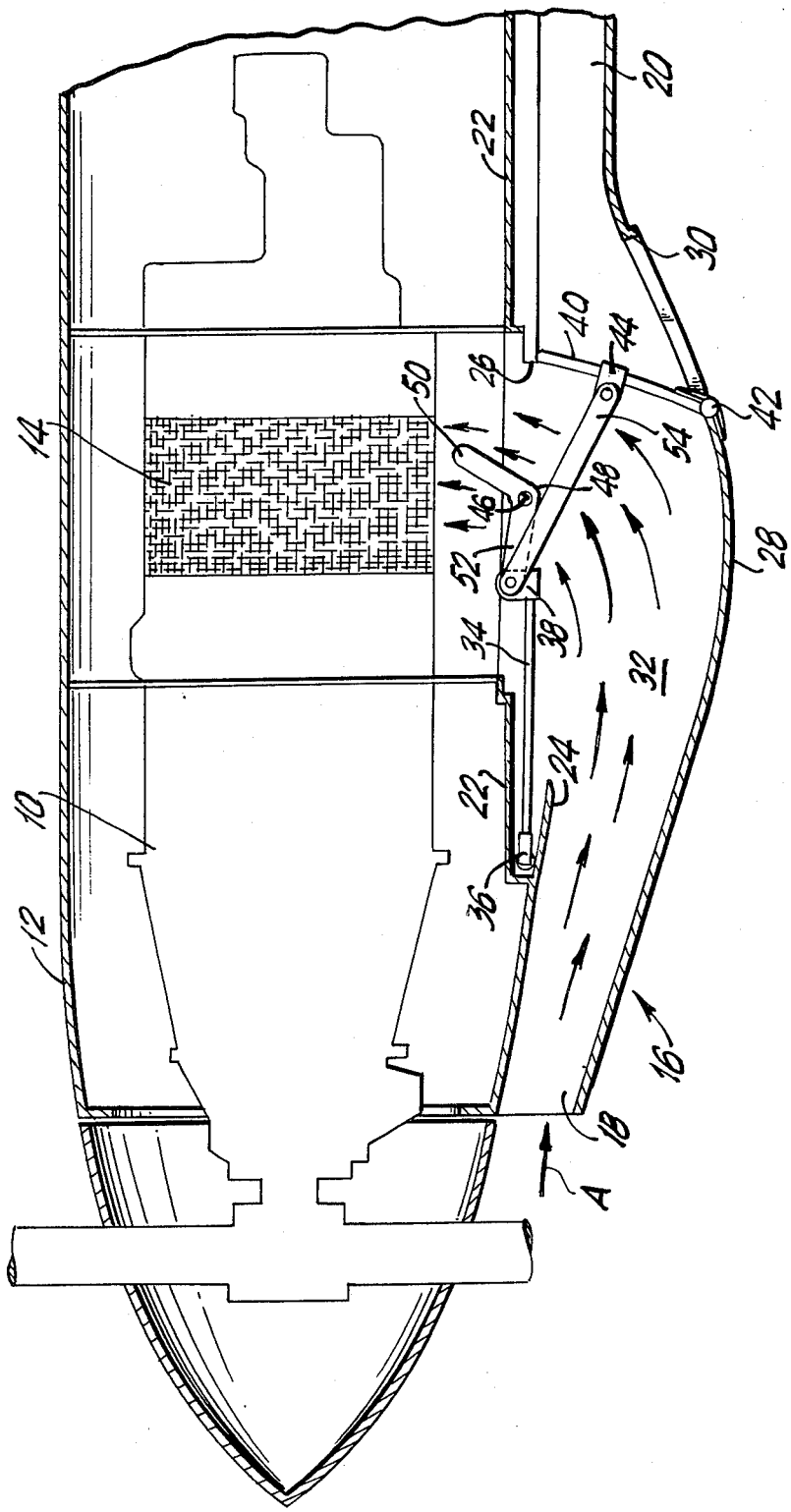
FIG. 1 is a diagrammatic, longitudinal cross-sectional view of a gas turbine propeller aircraft engine including an air intake duct having the new and improved actuating linkage system of the subject invention, with the deflecting vane and the bypass door being in the ram mode position.

Referring to FIG. 1, gas turbine propeller engine 10 is disposed within engine nacelle 12 and is equipped with a centrally located air intake 14. An air intake duct 16 is located at the underside of nacelle 12 and extends longitudinally of and parallel to engine 10. The air intake duct 16 is of a generally rectangular configuration having a forward facing open inlet 18 at one end and a discharge outlet 20 at the opposite end. Air intake duct 16 has a top side wall 22 which includes a forward lip extension 24 which is curved inwardly and downwardly to form the aerodynamically contoured top side of the forward facing open inlet 18. Top side wall 22 further includes a side opening 26 disposed intermediate its length at a point directly beneath engine air intake 14. The bottom side wall 28 of air intake duct 16 is curved and includes a recessed area 30 disposed at the rearward portion of the duct 16. A pair of opposed side walls 32 are provided which extend between top side wall 22 and bottom side wall 28. Air intake duct 16 is further provided with a deflecting vane 34 which is rotatably and translatably mounted at one end to the forward lip extension 24 of top side wall 22 by means of slide bearing or rotating link 36. Deflecting vane 34 also includes a stiff extension 38 extending from and normal to the opposed or free end of deflecting vane 34. A bypass door 40 is also disposed within air intake duct 16 and is pivotally connected at one end to bottom side wall 28 by hinge means 42 which is disposed at the forward portion of recessed area 30. Bypass door 40 further includes a stiff extension 44 which extends therefrom at a point intermediate the width of the bypass door 40.

Figure 2:
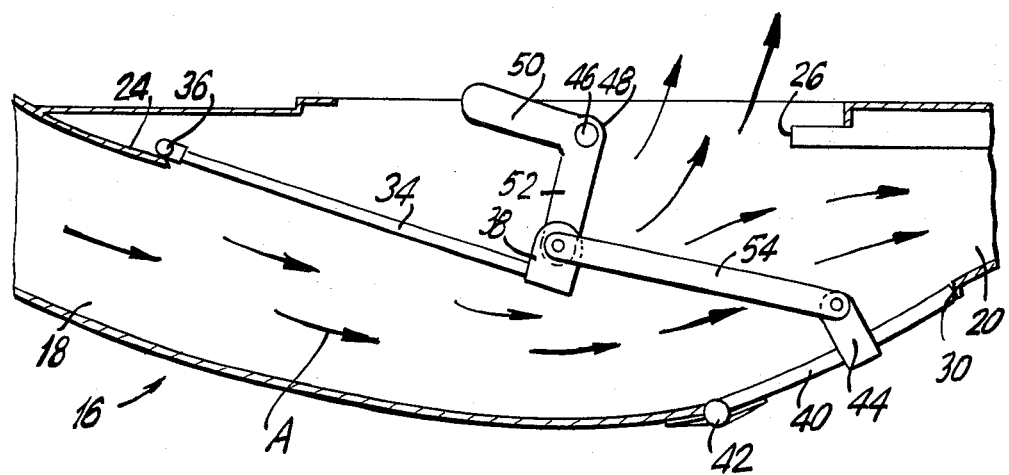
FIG. 2 is a cross-sectional view of the new and improved actuating linkage system, with the deflecting vane and the bypass door being in the anti-icing mode position.
Figure 3:
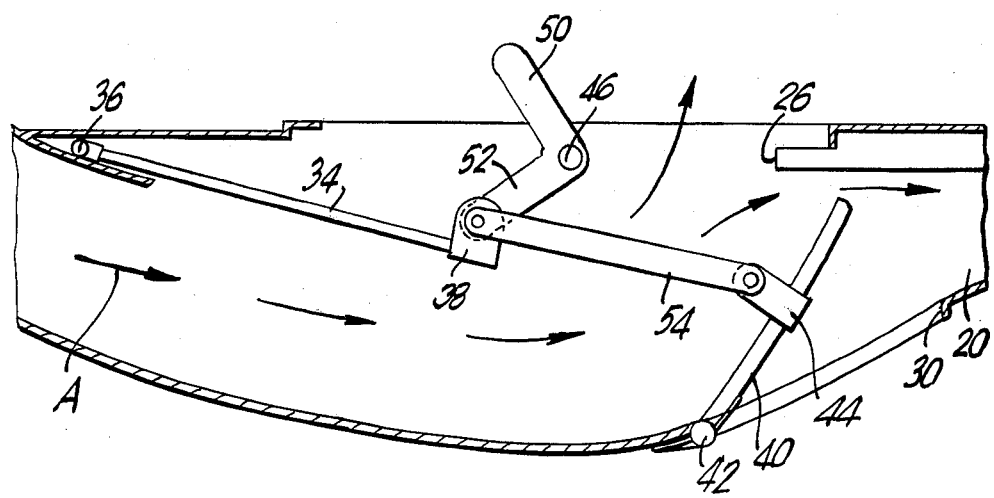
FIG. 3 is a cross-sectional view of the new and improved actuating linkage system, with the deflecting vane and the bypass door being in an intermediate position between ram mode and anti-icing mode position.

Referring to FIGS. 1, 2, and 3, the new and improved linkage system of the subject invention is rotatably mounted on a journal bearing 46 extending from side wall 32. A rotatable support sleeve 48 is mounted on journal bearing 46 and includes a pair of radially extending armlike projections, in the form of an actuator link 50 and a linear link 52. Actuator link 50 is pivotally connected at its opposite end to a mechanical actuation system which extends to the pilot's station. Linear link 52 is pivotally connected at its opposed end to stiff extension 38 fixed to the free end of deflecting vane 34. A coupler link 54 is pivotally connected at one end to stiff extension 38 and at its other end is pivotally connected to stiff extension 42 extending from bypass door 40.

FIG. 1 illustrates the various components of the air intake system in a ram mode position. As depicted therein, the deflecting vane 34 is in a stowed position, wherein it lies generally parallel to and adjacent top side wall 22 such that it is out of the path of the incoming airstream, designated by the letter A. The bypass door 40 is disposed in a raised position such that it extends from bottom side wall 28 to top side wall 22, thereby closing off discharge outlet 20. All of the incoming air flows through duct 16, entering at inlet 18, and is directed through side opening 26 to enter engine air intake 14 for full engine power.

The various components of the subject air intake system in the anti-icing mode position is illustrated in FIG. 2. In this position, the deflecting vane 34 extends within duct 16 at an angle of approximately 17° with respect to the top side wall 22. Bypass door 40 is lowered to a stowed position such that it lies adjacent to bottom side wall 28 and is disposed within recessed area 30 and hence out of the path of the airflow A. In the anti-icing mode, the deflecting vane 34 confines the incoming airflow to a passage of gradually decreasing cross-section. The incoming air is deflected through a substantial angle around the trailing edge of the deflecting vane 34 up into side opening 26 prior to entering engine air intake 14. The portion of the incoming airstream carrying particles of greater inertia travels through duct 16 in a substantially unimpeded path out through discharge outlet 20 and is exhausted to the atmosphere.

FIG. 3 depicts the relative positions of the components of the air intake system in an intermediate stage during the shift of the system between the ram and anti-icing modes. A change in the relative positions of the deflecting vane 34 and the bypass door 40 so as to shift the air intake system from ram mode to anti-icing mode is effected by movement of the actuator link 50. In comparing FIGS. 1, 2, and 3, it may be seen that if actuator link 50 is rotated counterclockwise, linear link 52 will also rotate in that same direction. This motion of linear link 52 is operative to rotate and translate deflecting vane 34 downward at an angle into the interior of duct 16. The movement of the deflecting vane 34 is transmitted to bypass door 40 through connector link 54 which operates to lower bypass door 40 to its stowed position within recessed area 30, thereby placing the system in an anti-icing mode. In the embodiment described herein, the deflecting vane 34 is preferably mounted to top side wall 22 by a slide bearing 36 which permits rotational and translational movement of the deflecting vane while requiring minimum space. Other air intake ducts having fewer space constraints may be designed in which case any mounting means which permits rotational and translational movement of the deflecting vane may be utilized. As for example, a pivoting link may be provided having one end pivotally connected to a pivot pin extending from the forward portion of side wall 32, which is pivotally connected to the forward end of deflecting vane 34 at the opposed end thereof so that full rotational ability of the link and the deflecting vane is provided about the pivot pin.

To shift the air intake system from anti-icing mode to ram mode the actuator link 40 must be rotated clockwise from the position shown in FIG. 2 to that depicted in FIG. 1. The clockwise rotation applied to the actuator link 50 causes the simultaneous clockwise rotation of linear link 52. The movement of linear link 52 operates to rotate the deflecting vane upwards towards top side wall 22 and to translate it forward towards inlet opening 18 of duct 16. This movement of deflecting vane 34 is reflected in the simultaneous upward movement of bypass door 38 by virtue of the connecting link 52.

Figure 4:
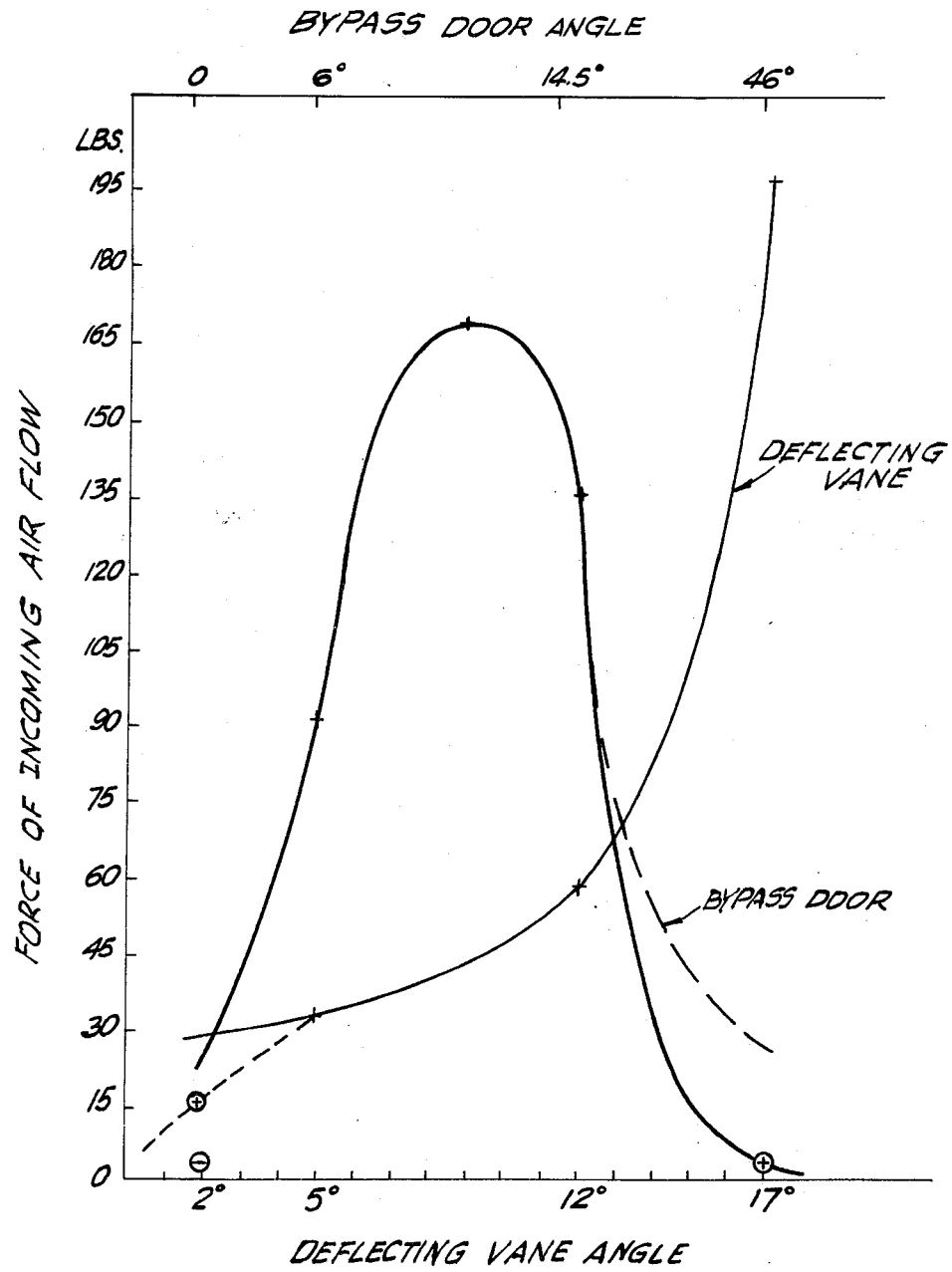
FIG. 4 is a graph of the aerodynamic forces exerted by the incoming airflow on both the deflecting vane and the bypass door as a function of the angle of the deflecting vane with respect to the top side wall of the air intake duct, at an air speed of 200 knots.

As air flows into the air intake duct 16, the pressure of the incoming airflow exerts an aerodynamic force on both the deflecting vane and the bypass door. A related configuration was designed and tested and a plot of the forces exerted on the deflecting vane 34 and the bypass door 40 as a function of their relative positions during the shift of the air intake system between the ram and anti-icing modes is depicted in FIG. 4, at an operational air speed of 200 knots. The relative positions of the deflecting vane 34 and bypass door 40 are expressed in terms of angles, with the position of the deflecting vane 34 being expressed in terms of the angle formed between it and the top side wall 22. The position of the bypass door 40 is expressed in terms of an angle made by its present position with respect to its fully raised position in ram mode, i.e., ram mode position equals zero degrees. The rotational arc of the deflecting vane 34 between its ram mode position and the anti-icing position is approximately 17°. The rotational arc of the bypass door 40 between ram mode and anti-icing mode positions is approximately 46°. As shown in FIG. 4, as the deflecting vane 34 is lowered into the incoming airstream to its anti-icing position, the aerodynamic force pushing against the deflecting vane increases, with the force reaching a maximum of 195 pounds at the anti-icing position. This amount of force corresponds to the amount of force the individual actuator of prior art anti-icing systems had to overcome to position the deflecting vane in the anti-icing position.

Referring now to the plot of forces being exerted on the bypass door 40 by the incoming airflow, as shown in FIG. 4, and by reading the curve from 46° to zero degrees, the forces exerted on the bypass door as it is being raised to a ram mode position may be examined. As shown therein, as bypass door 40 is raised, the forces exerted by the incoming airflow increase to a maximum corresponding to a point at which the system is in an intermediate position as shown in FIG. 3. Then the forces decrease as the bypass door 40 is further raised to its ram mode position. When bypass door 40 is in its stowed or anti-icing position, the airstream carrying the airborne particles flows over it to the discharge outlet 20. As the bypass door 40 is raised, this flow of air impinges on the bypass door thereby exerting a force thereon. The magnitude of this force increases to a critical point. When the bypass door is raised beyond this critical point, the bypass door 40 and the curved configuration of bottom side wall 28 cooperate to more clearly define a smoothly curving passage which, in conjunction with the aerodynamic properties of the incoming airstream, operates to change the direction of the flow of the incoming air such that the airflow impinges less on bypass door 40 and instead is redirected towards side opening 26 in top side wall 22. The force exerted by the incoming air on the bypass door at the critical point is approximately 158 pounds, corresponding to the amount of force the individual actuator provided by prior art anti-icing systems had to overcome in order to restore the bypass door to the ram mode position.

The new and improved actuating linkage system of the subject invention joins bypass door 40 and deflecting vane 34 by means of coupler link 54, so that the bypass door 40 and the deflecting vane 34 move in a unitary fashion as one part. This combination part comprised of the deflecting vane 34, the coupler link 54, and the bypass door 40 is connected to actuating link 50 by means of linear link 52 and rotatable support sleeve 48. The journal bearing 46 upon which the rotatable support sleeve 48 is mounted serves as a pivot point about which the entire linkage system operates.

Figure 5:
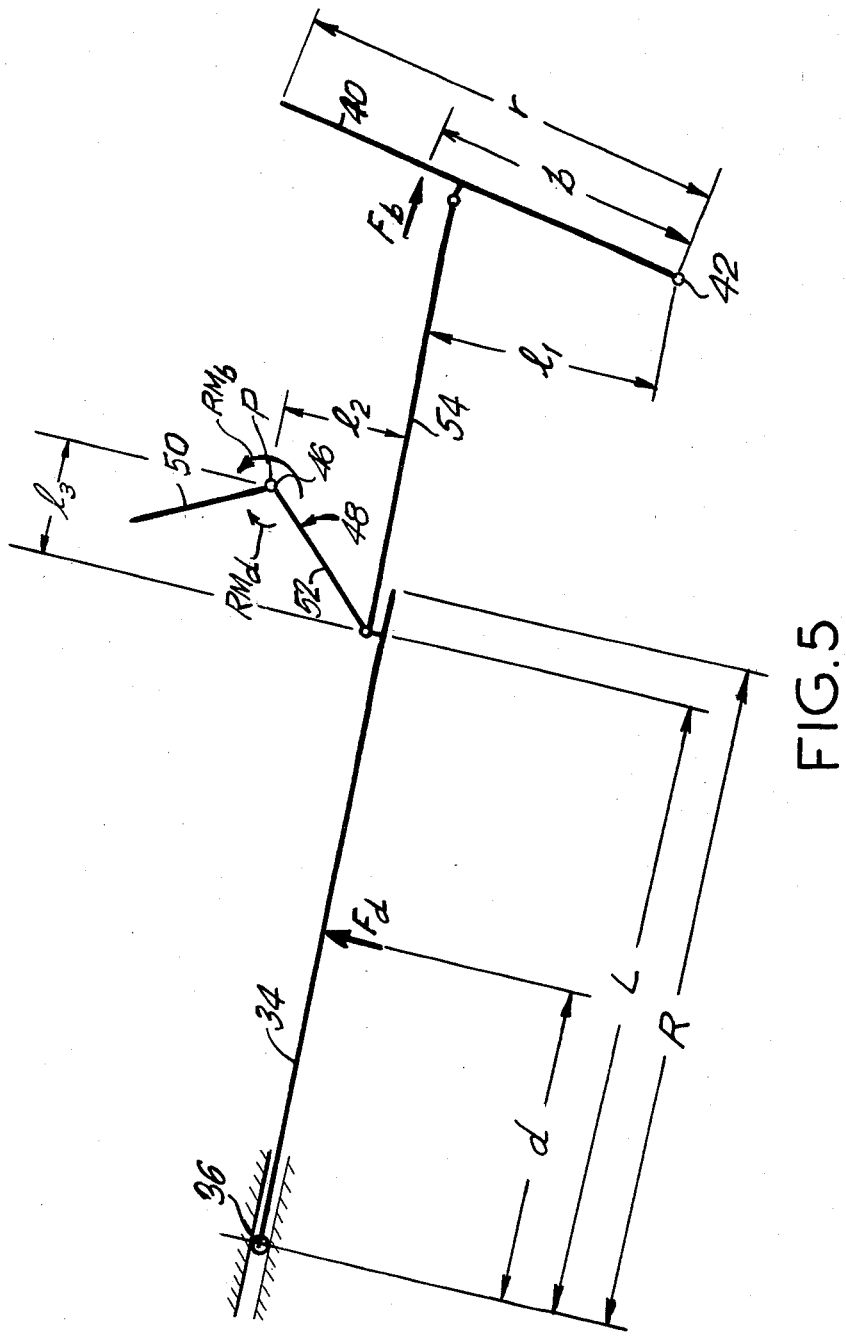
FIG. 5 is a schematic representation of the force vectors acting on a model of the subect actuating linkage system.

Referring generally to FIG. 5, a schematic representation of a model linkage system is shown including pivot point P which corresponds to the combined structure of rotatable support sleeve 48 and the journal bearing 46. The aerodynamic force exerted on the deflecting vane $F_d$, tends to push deflecting vane 34 up out of the path of the incoming airflow. The structure of the linkage system is such that for the deflecting vane 34 to be pushed upwards, it must also be translated forward within slide bearing 36. The force $F_d$ exerted by the incoming airflow on the deflecting vane will therefore impart a rotational moment to the linkage system felt by the system about pivot point P. The aerodynamic force $F_d$ acts upon the deflecting vane at a point intermediate its length. The configuration of the model air intake duct is such that the pressure of the incoming air exerts a concentrated force at point "d" measured to be at a distance of 4.47 inches from slide bearing 36 over a total length for the deflecting vane of length R and L; i.e., measurements between the supports. In the model, L was designed to be 8.43 inches, while R was 8.96 inches. In order for a force $F_d$ to raise the deflecting vane within this given linkage system, it must act through the lateral distance $l_3$. The rotational moment imparted to the actuator link 50 about pivot point P can therefore be expressed by the formula:

$$RM_d = F_d \times \frac{d}{L} \times l_3$$

The resulting rotational moment is in a clockwise direction about point P.

Similarly, the aerodynamic force $F_b$ exerted on the bypass door 40 tends to rotate the bypass door clockwise about hinge means 42. The configuration of the air intake duct 16 is such that the pressure of the incoming air exerts a concentrated force $F_b$ on a fixed point on the bypass door 40 measured to be a distance "b" (2.93 inches in the model) from the pivoting hinge 42 which connects the bypass door 40 to bottom side wall 18. The action of the force $F_b$ is transmitted via the linkage system through the vertical components $l_1$ and $l_2$ and is felt as a counterclockwise rotational moment about the pivot point P. The rotational moment imparted to the linkage system by the force $F_b$ may be expressed by the formula:

$$RM_b = \frac{F_b \times b}{l_1} \times l_2$$

In the new and improved linkage system of the subject invention, the rotational moments $RM_d$ and $RM_b$ respectively imparted to the system by the aerodynamic forces $F_d$ and $F_b$ counteract one another to produce a resultant rotational moment, $RM_{tot}$. This rotational moment is stored within the system and is felt in the actuator link 50 as a resistance or torque. The resultant rotational moment stored within the new and improved linkage system may be calculated by the formula:

$$RM_{tot} = RM_b - RM_d$$

The resultant rotational moment for the system felt in the actuator as a torque, has been calculated at given points during the shifting of the air intake system from ram mode to anti-icing mode and at various speeds of operation. The results of these calculations of the designed model are summarized in the following table:

| Angle of Deflecting Vane | Angle of Bypass Door | $F_d$ | | | $F_b$ | | | $l_1$ | $l_2$ | $l_3$ |
|---|---|---|---|---|---|---|---|---|---|---|
| | | 100 | 200 | 300 | 100 | 200 | 300 | | | |
| 2° | 0° | 13.5 | 13.5 | 13.5 | 30.0 | 80.0 | 110.0 | 2.95 | 0.83 | 2.50 |
| 5° | 6° | 20.0 | 32.0 | 35.0 | 31.5 | 87.0 | 120.0 | 3.22 | 1.24 | 2.41 |
| 12° | 14¼° | 56.0 | 57.0 | 59.0 | 45.0 | 115.0 | 175.0 | 3.30 | 1.67 | 1.91 |
| 17° | 46° | 178.0 | 195.0 | 280.0 | 3.0 | 3.0 | 3.0 | 2.62 | 2.50 | 0.02 |

| Angle of Deflecting Vane | Angle of Bypass Door | $RM_d$ | | | $RM_b$ | | | $RM_{total}$ | | |
|---|---|---|---|---|---|---|---|---|---|---|
| | | 100 | 200 | 300 | 100 | 200 | 300 | 100 | 200 | 300 |
| 2° | 0° | 17.90 | 17.90 | 17.90 | 24.73 | 65.95 | 90.68 | 6.84 | 48.06 | 72.79 |
| 5° | 6° | 25.56 | 40.89 | 44.73 | 35.54 | 98.16 | 135.40 | 9.98 | 57.27 | 90.67 |
| 12° | 14¼° | 56.72 | 57.73 | 59.67 | 66.73 | 170.52 | 259.49 | 10.01 | 112.79 | 199.73 |
| 17° | 46° | 1.89 | 2.07 | 2.97 | 8.39 | 8.39 | 8.39 | 6.50 | 6.32 | 5.42 |

Figure 6:
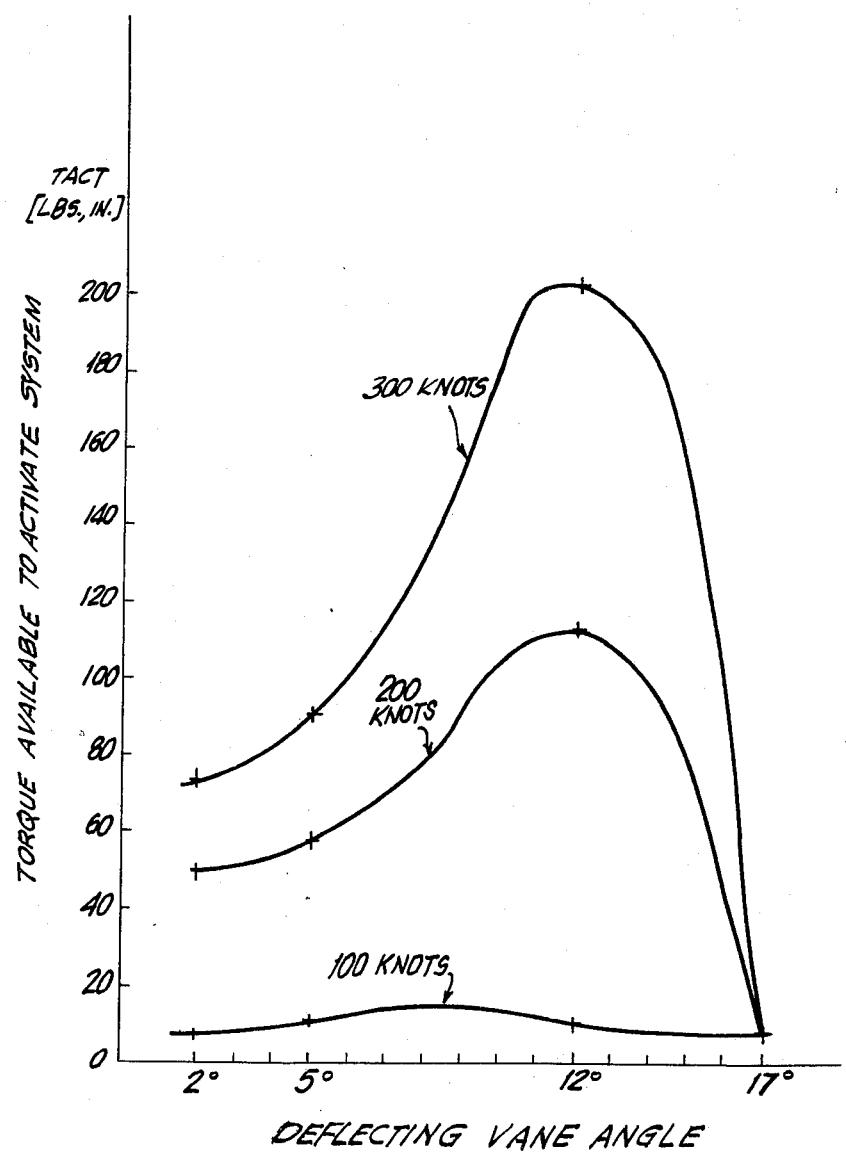
FIG. 6 is a graph illustrating the amount of torque in pounds-inch which must be applied to the actuator link to shift the deflecting vane and bypass door between a ram mode position and an anti-icing mode position, as a function of the angle of the deflecting vane with respect to the top side wall of the air intake duct at various air speeds.

FIG. 6 is a graph plotting the amount of torque stored within the linkage system as a function of the angle of the deflecting vane 34. Referring more particularly to the curve depicting the torque stored in the actuator at an air speed of 200 knots, it will be noted that said torque reaches a maximum at a point midway between ram mode position and anti-icing mode position. The amount of torque at this point is approximately 112 pound-inch and this torque is felt as a resistance in the actuating link 50 by the pilot. In order to shift the air intake system from ram mode to anti-icing mode, the pilot must apply an input to the actuating link greater than 112 pound-inch. This amount of torque within the actuator which must be overcome by the input from the pilot is the same for shifting the air intake system from ram mode to anti-icing mode, as well as from anti-icing mode back to ram mode. When one compares the amount of input which was required for the boost actuators in prior art devices to shift those air intake systems between anti-icing mode and ram mode positions, the advantage of the new and improved actuating linkage system of the subject invention is readily apparent. For example, in order to deploy the deflecting vane to its anti-icing position, prior art actuators were required to overcome 195 pounds of force, and in order to raise the bypass door from the anti-icing position to a ram mode position, the prior art actuators were required to overcome 168 pounds of force. In the subject invention, however, the forces on the deflecting vane 34 and on the bypass door 40 counteract one another and produce a maximum resistance of 112 pound-inch of force on the single actuator link 50.

The decreased amount of input which is required to overcome the resistance in the actuating link 50 may be further reduced by manipulating the relative lengths of the actuating link 50 with respect to the linear link 52 so as to provide the pilot with the greater mechanical advantage which can be utilized when shifting the system from one mode to another. Thus, if the relative lengths of the actuating link 50 and the linear link 52 within the linkage system are in a ratio of 6 to 1, this affords the pilot a mechanical advantage six times as great, so that the pilot must apply 1/6th of the amount of input at the pilot station to overcome the torque or resistance stored within the actuating link 50, or in this case a force of 18.6 pounds. This amount of force may be readily applied manually by the pilot. The new and improved actuated linkage system of the subject invention therefore provides a manually operative anti-icing system for aircraft engines. It is noted that the new and improved actuating linkage system of the subject invention has been described herein in terms of the forces exerted by the incoming airflow on the deflecting vane and the bypass door. The description does not take into account the effects of negative air pressure generated within the discharge outlet on the rearward side of the bypass door when the bypass door is in the ram mode position. The negative air pressure generated in the discharge outlet would also tend to rotate the bypass door downwardly which would increase the magnitude of $RM_b$ which, in turn, would increase $RM_{tot}$. The increase in magnitude of $RM_{tot}$ contributed by the negative air pressure would generally not be large enough to be significant and for the sake of clarity and simplicity, has not been considered in the above description.

Another characteristic of the new and improved linkage system of the subject invention is that the system is balanced to favor the anti-icing mode, thereby effectively providing a fail safe system. In the event of any failure in the actuator, the aerodynamic forces $F_b$ exerted on the bypass door act to shift the system to anti-icing mode. Expressed differently, the quantity $RM_b - RM_d$ is always positive, to that the resultant rotational moment within the linkage system is operative to shift the system automatically to anti-icing mode, thereby preserving the flight safety of the aircraft.

While the subject invention has been described with reference to a preferred embodiment, it is apparent that various modifications and changes may be made therein by one skilled in the art without departing from the scope and spirit of the invention as defined by the appended claims.

I claim:

1. An anti-icing system for use in an aircraft engine of the type including an air intake duct extending generally longitudinally of the engine and including a top wall, a bottom wall and side walls, said duct having a forward facing open inlet at one end, a side opening in the top wall disposed intermediate the length of the duct, and a discharge outlet at the other end, a deflecting vane rotatably and translatably mounted at one end to the top wall of the intake duct at a point intermediate the forward facing inlet and the side opening, and a bypass door pivotally mounted at one end to the bottom wall of the air intake duct at a point intermediate the side opening and the discharge outlet, said deflecting vane and bypass door adapted to be positioned to form an inertial particle separator, the improvement being an actuating linkage system comprising:

a journal bearing fixedly mounted to and extending from one of said side walls adjacent to the top wall at a point intermediate the free end of the deflecting vane and the side opening;

a support sleeve rotatably mounted on said journal bearing;

an actuator link extending from a pilot's station and connected to said rotatable support sleeve;

a linear link connected at one end to said rotatable support sleeve and having the opposed end thereof pivotally connected to the free end of the deflecting vane; and a coupler link pivotally connected at one end to said free end of the deflecting vane and pivotally connected at the opposed end thereof to the bypass door at a point intermediate the width of said bypass door whereby movement of the actuator link varies the relative positions of the deflecting vane and the bypass door between ram mode and anti-icing mode positions, with said actuating linkage system at least partially balancing the aerodynamic forces on the deflecting vane and bypass door so that the input required to operate the anti-icing system may be manually applied by the pilot.

2. An anti-icing system as recited in claim 1 wherein said actuating linkage system is operative such that the aerodynamic forces on the bypass door, should be actuating link extending to the pilot station fail, cause the deflecting vane and bypass door to be actuated to the anti-icing mode position.

3. An anti-icing system as recited in claim 1 wherein said deflecting vane is rotatably and translatably mounted to said top wall by means of a slide bearing.

4. An anti-icing system as recited in claim 1 wherein said linear link and said coupler link are each pivotally connected to a first stiff extension extending from said deflecting vane adjacent the free end thereof.

5. An anti-icing system as recited in claim 2 wherein said coupler link is pivotally connected to a second stiff extension extending from said bypass door at a point intermediate the width thereof.

6. An anti-icing system for use in an aircraft engine of the type including an air intake duct extending generally longitudinally of the engine and including a top wall, bottom wall and side walls, said duct having a forward facing open inlet at one end, a side opening in the top wall disposed intermediate the length of the duct, and a discharge outlet at the other end, a deflecting vane rotatably and translatably mounted at one end by means of a slide bearing to the top wall of the intake duct at a point intermediate the forward facing inlet and the side opening and having a first stiff extension extending from said deflecting vane adjacent to opposed end thereof, and a bypass door pivotally mounted at one end to the bottom wall of the air intake duct at a point intermediate the side opening and the discharge outlet and having a second stiff extension extending from said bypass door at a point intermediate its width, said deflecting vane and bypass door adapted to be positioned to form an inertial particle separator, the improvement being an actuating linkage system comprising:

a journal bearing fixedly mounted to and extending from one of said side walls adjacent to the top wall at a point intermediate the free end of the deflecting vane and the side opening;

a support sleeve rotatably mounted on said journal bearing;

an actuator link extending from the pilot station connected to said rotatable support sleeve;

a linear link connected at one end to said rotatable support sleeve and having the opposed end thereof pivotally connected to said first stiff extension extending from the free end of the deflecting vane; and a coupler link pivotally connected at one end to said first stiff extension extending from the free end of the deflecting vane and being pivotally connected at the opposed end thereof to said second stiff extension extending from the bypass door;

whereby movement of the actuator link varies the relative positions of the deflecting vane and the bypass door between ram mode and anti-icing mode positions and said actuating linkage system at least partially balances the aerodynamic forces on the deflecting vane and bypass door so that the input required to operate the anti-icing system may be manually applied by the pilot.

7. An anti-icing system as recited in claim 6 wherein said actuating linkage system is operative such that the aerodynamic forces on the bypass door, should the actuating link extending to the pilot station fail, cause the deflecting vane and bypass door to be actuated to the anti-icing mode position.

* * * * *